United States Patent [19]
Ajji et al.

[11] Patent Number: 5,695,698
[45] Date of Patent: Dec. 9, 1997

[54] PRODUCTION OF ORIENTED PLASTICS BY ROLL-DRAWING

[76] Inventors: Abdellah Ajji, 324 De Beauharnois, Boucherville, Quebec, Canada, J4B 7V6; Michel M. Dumoulin, 502 Des Falaises, Mont St-Hilaire, Quebec, Canada, J3H 5R7; Jacques Dufour, 386 Laurier Avenue, Otterburn Park, Quebec, Canada, J3H 1E3

[21] Appl. No.: 594,277

[22] Filed: Jan. 30, 1996

[51] Int. Cl.$^6$ .................................................. B29C 55/06
[52] U.S. Cl. .................. 264/40.1; 264/40.6; 264/40.7; 264/175; 264/210.2; 264/210.7; 264/280; 264/288.4; 425/135; 425/141; 425/145; 425/325; 425/363; 425/382.3
[58] Field of Search ................... 264/210.2, 280, 264/175, 288.4, 323, 40.1, 40.7, 40.76; 425/382.3, 325, 363, 145, 135, 141

[56] References Cited

U.S. PATENT DOCUMENTS

| | | | |
|---|---|---|---|
| 3,714,320 | 1/1973 | Shaw | 264/323 |
| 4,085,187 | 4/1978 | Jenks et al. | 264/280 |
| 4,514,351 | 4/1985 | Kaeufer et al. | 264/280 |
| 4,789,514 | 12/1988 | Lo | 264/323 |
| 4,801,419 | 1/1989 | Ward et al. | 264/288.4 |
| 4,820,466 | 4/1989 | Zachariades | 264/323 |
| 4,837,407 | 6/1989 | Nezu | 174/68.5 |
| 4,956,140 | 9/1990 | Rolles et al. | 264/323 |
| 5,049,347 | 9/1991 | Magill et al. | 264/288.4 |
| 5,096,654 | 3/1992 | Craggs et al. | 264/323 |
| 5,133,922 | 7/1992 | Kaeufer et al. | 264/280 |
| 5,234,652 | 8/1993 | Woodhams et al. | 264/210.2 |
| 5,399,308 | 3/1995 | Woodhams et al. | 264/288.4 |
| 5,405,699 | 4/1995 | Van Erden et al. | 264/280 |
| 5,525,391 | 6/1996 | Dipede et al. | 428/57 |

FOREIGN PATENT DOCUMENTS

| | | | |
|---|---|---|---|
| 1299331 | 4/1987 | Canada . | |
| 52-11257 | 1/1977 | Japan | 264/210.2 |
| 1-108023 | 4/1989 | Japan | 264/280 |
| 1-108027 | 4/1989 | Japan | 264/288.4 |
| 4-323023 | 11/1992 | Japan | 264/175 |

OTHER PUBLICATIONS

Bigg D.M. et al., Mechanical Property Enhancement . . . , Journal of Engng. for Industry, vol. 106, 1984, pp. 109–113.
Sun D.C. et al., Structure–Property Relationships . . . , Polymer Engng. and Science, 1990, vol. 30, No. 11, pp. 635–643; vol. 29, p. 715.
Bigg D.M. et al., Fabrication of High Modulus Films . . . , Polymer Engng. and Science, Oct. 1986, vol. 26, No. 18, pp. 1254–1263.
Williams R.F. et al., Roll Clearer and Better Sheet–Faster, SPE Journal, 1971–vol. 27, pp. 42–48.
Caddell R.M., On the Tensile Behaviour of High Density . . . —Mater. Sci. Eng., 9(1972), pp. 223–229.

*Primary Examiner*—Jeffery R. Thurlow
*Attorney, Agent, or Firm*—Juliusz Szereszewski

[57] ABSTRACT

A process and apparatus for the continuous solid state forming of semicrystalline polymers using roll-drawing is disclosed. The output of an extruded thick polymer profile is stabilized by a gear pump. The profile is passed through a die for the desired geometry and a cooling calibrator. The profile is heat conditioned in heating tunnels to a temperature below the melting point prior to deformation between sets of rolls. A plurality, e.g. four pairs of rolls apply both compression and tension to the polymer profile. The tension applied on the profile, the roll gap, the linear speed of the profile and its temperature are monitored and controlled for the amount of polymer deformation and relaxation allowed. High tensile modulus and strength, both in the longitudinal and transverse direction of the polymeric strip, can be achieved.

17 Claims, 8 Drawing Sheets

PRODUCTION OF ORIENTED PLASTICS BY ROLL-DRAWING

FIELD OF THE INVENTION

This invention relates to the solid state deformation through continuous roll-drawing at relatively high output rates, of thermoplastic polymers, including polyolefins and engineering plastics, the process being capable of imparting relatively high molecular orientation leading to high strength and modulus of the processed plastics in both longitudinal and transverse directions.

BACKGROUND OF THE INVENTION

Replacement of some conventional structural materials has led material scientists and engineers to look at new materials and processes to enhance the properties of some existing materials. In fact, conventional structural high performance materials (composites, metals, . . . ) have some shortcomings such as the weight, recyclability, adhesion of the reinforcement, etc. Hence, the development of ultra-high modulus polymeric products is of paramount importance in view of their significantly lower density; for example, steel is about eight times more dense than polyethylene. In fact, the term specific modulus, which refers to the ratio of the modulus to density, is significantly higher for highly oriented polymers than that of metals in general.

On the other hand, the carbon-carbon bond is the strongest bond known to date. It is desirable to obtain a material containing this bond so that these bonds are aligned together in the same direction. Such material would have a very high modulus and strength. Obviously, economics of the manufacturing are important beside the technology. In fact, it has been known for a long time that the theoretical tensile modulus of a polymer should approach the modulus of steel (208 GPa) or even higher. However, until about 15 years ago, the values based on theoretical calculations (240–300 GPa for polyethylene for example) were considered unlikely to be achieved because all known polymers had moduli two orders of magnitude lower. The reason for such a low modulus was that the polymer assumed a random entangled and twisted configuration which had a low bearing capacity. In recent years, it was realized that the greatest modulus and strength would result from an anisotropic structure of highly oriented, extended, and densely packed chains. Indeed, some polymers, for example polyethylene, have been processed into fibers that exhibit moduli of 100–200 GPa, thereby indicating that the above mentioned theoretical values can be approached.

Conventional flexible chain polymers, e.g. polyethylene, have been processed into high modulus products by processes that can induce a permanent deformation of the internal structure, namely, the conversion of an initially isotropic and spherulitic structure to a fibrillar structure. The fibrils are made of oriented and extended molecular chains which ensure mechanical connection between crystals and thereby load transfer. It can be realized that, for maximum mechanical performance, all polymer chains should be extended along the deformation direction. Thus macroscopic deformation, which involves molecular deformation and is accompanied by drastic dimensional changes in the case of flexible polymers, should not be confused with the shaping processes which in general are also accompanied by dimensional changes but do not involve the transformations of a spherulitic to fibrillar morphology, which, in the case of high density polyethylene, takes place at a deformation ratio of approximately 4. Nor should macroscopic deformation be confused with the conventional melt extrusion process which may involve some molecular orientation. Indeed, during any melt processing operation some molecular orientation occurs because of the viscoelastic nature of polymeric materials. However, the fraction of extended chains is exceedingly small, too small to result in high modulus/strength performance.

Anisotropic polymer morphologies with ultra high modulus and strength have been obtained by processing conventional flexible chain polymers by solid state deformation using the extrusion and drawing techniques, by extrusion of supercooled melts and by drawing from gels and dilute flowing solutions. Various semi-crystalline polymers have been studied. High density polyethylene has been studied the most because of its simple composition and its high theoretical modulus. Typically, the ultra high modulus products from the above processes have been in the form of fibers and thin films, that is structures which do not have bulk mechanical properties. The solid state extrusion process has been investigated for its potential use for the production of ultra high modulus products with bulk structure. However it has been severely limited by low processing rates (a few centimeters per minute) for it is a solid-state deformation process through a convergent geometry. Also, solid state extrusion requires very high extrusion pressures, especially for the preparation of products with complex or large cross-sectional areas. An analysis of the extrusion process showed that a high extrusion pressure is required for the shear and elongational deformation to take place and to overcome the die-polymer friction.

There are a number of solid state orientation processes that have been used to produce highly oriented, high modulus polymers. These processes include drawing, extrusion and rolling. All three techniques rely on realigning the existing crystal structure into a highly oriented fibrillar structure by an extensional deformation process. Each of these techniques also has several variations and unique features associated with it. Drawing can be isothermal or nonisothermal, free or constrained deformation. Extrusion can be direct or hydrostatic, adiabatic or isothermal. Rolling can be with or without tension, adiabatic or isothermal.

PRIOR ART

Examples of solid-state ram extrusion of semicrystalline polymers are: Kolbeck and Uhlman, J. Polymers Science, Phys. Ed., Vol. 15, 27–42 (1977); Imada et al., J. Materials Science, Vol. 6, 537–546 (1971); Farrel and Keller, J. Materials Science, Vol. 12, 966–974 (1977); Otto and Hower, UK patent 2,052,357; Dunnington et al., U.S. Pat. No. 4,266,919; Groff, U.S. Pat. No. 4,145,175; Murray, U.S. Pat. No. 3,954,372; Cottington, U.S. Pat. No. 3,887,319. All of these approaches suffer from problems of very low rates of production and the ability to manufacture products of only small cross-sectional areas, and provide little or no enhancement in properties through molecular orientation.

Ward et al., UK patent 2,060,469 disclose a process for the solid phase deformation of a workpiece of an orientable thermoplastic polymer which comprises providing the workpiece of the essentially unoriented polymer at the entry side of a die, applying to the workpiece from the exit side of a die a draw tension insufficient to cause tensile failure of the workpiece; and drawing the workpiece through the die so that its plastic strain is progressively increased during start-up of the process. Speeds of at least 50 cm/min. and draw ratios above 10 were reported. The temperature range depended on the polymer used. This process was reported to be possibly continuous.

Ward and Selwood, UK patent 2,156,733, extended the above described process to hollow workpieces and tubular materials.

Zachariades in U.S. Pat. No. 4,820,466 discloses a method for producing high modulus semi-crystalline polymer product comprising solid state extrusion of a polymer having an initial polymer morphology by feeding under pressure through an extrusion-rotation die having a static entry position and a succeeding friction-reducing moving portion of said die comprising a pair of oppositely rotating members, each having integral shaped wall surfaces. Various different shapes were obtained and feeding was either in the form of billets, gel or powder. Values of the Young modulus and tensile strength between 2220 GPa and 0.15–5 GPa respectively and speeds up to 5 m/min. were reported.

Woodhams et al., U.S. Pat. No. 5,234,652, disclose a process for producing a high modulus article including forcing a high molecular weight plastic material through a passage of which the cross sectional area diminishes in the forward direction of plastic flow, thus producing an extrudate. The plastic material is extruded while it is close to or at its melt temperature and it is lubricated to obtain substantially plug flow through the passage. The speed at which the plastic material flows through the passage is adjusted so that the elongational velocity gradient at any longitudinal position within the passage does not exceed 2.6 s-1, thus minimizing the degree of molecular orientation in the extrudate. The extrudate can be deformed by drawing while it is maintained at or close to its melt temperature, thus producing an oriented, deformed extrudate. The oriented extrudate is then quickly cooled to preserve orientation. The maximum extrusion rate reported was 42.5 cm/min., the molecular draw ratio between 3.9 and 5.2, the tensile strength between 140–210 MPa and Young modulus were 1.24–2.0 GPa.

Courval in U.S. Pat. No. 5,169,587 discloses a solid state extrusion process in which a billet of a semi-crystalline polymer is forced through a die at the end of a chamber at a temperature between 30° C. below the alpha-crystalline temperature of the polymer and the melting point of the polymer, the die being 5° C. warmer than the polymer. A haul of stress on the profile extruded from the die is maintained between at least 0.5 MPa and a maximum amount without plastic deformation of the extrudate to obtain an oriented profile having a cross-sectional area greater than 0.5 cm$^2$ at an extrusion rate greater than 50 cm/min.

Francoeur et al. in U.S. Pat. No. 5,169,589 disclose a process, apparatus and product related to extrusion or other deformation of solid thermoplastic polymers including using a die or other deformation device that have an interior passageway of changing cross-sectional shape commencing with an inlet of compact cross-section and ending with an outlet corresponding to the angular shape of the final extruded profile.

While drawing, extrusion and rolling can be used to produce highly oriented films and sheets and other shapes, rolling has the advantage of having the highest output rate. Rolling processes have been used for a long time to produce vinyl and rubber sheet stock.

Williams and Morrison, SPE J., Vol. 27, 42 (1972) describe fluid lubricated rolling of semicrystalline polymers with the resultant improvement in mechanical properties. They did not investigate high degrees of orientation, however, and they presented evidence of a spherulitic morphology in their most highly oriented samples. As a result, the strength and modulus of their samples are not consistent with a highly oriented material despite reading a maximal draw ratio of 6:1.

Caddell, Bates and Yeh (Mater. Sci. Eng., Vol. 9, 223 (1972) investigated room temperature rolling of HDPE. The maximum draw ratio studied was only 2:1. Jenks and Kipp, U.S. Pat. No. 4,085,187, disclose thickness reduction ratios of 20:1 in room temperature rolling of polymers, primarily PE and PP. Enhanced mechanical properties are mentioned, although data are not presented.

Dhingra, Spruiell and Clark published the results of cold rolling experiments with polypropylene (Polym. Eng. Sci., Vol. 21, 1063 (1981)). They found that the degree of thickness reduction obtained at room temperature was limited to 5:1, whether one pass or multiple passes was used.

Bigg et al. described solid-state rolling at elevated temperatures to thickness reduction ratios up to 11:1, in which a fibrillar morphology was created (J. Eng. Ind. Vol. 106, 109 (1984)). They also showed (Polym. Eng. Sci., Vol. 26, 1254 (1986)) that speeds as high as 20 m/min. can be achieved by adiabatical rolling, and that the tension influences the extent of orientation in the amorphous phase, which affect the chemical and thermal stability of the polymer. Kitamaru and Hyon, in J. Polym. Macromol. Rev., Vol. 14, 207 (1979) describe a rolling process in which feedstock sheet is preheated prior to rolling. They rolled high density PE film to only 4.6:1 deformation ratio.

Kaito, Nakayama and Kanetsuna describe a rolling process in which a sheet of HDPE was drawn between undriven, free turning rolls to obtain thickness reduction ratios as high as 25:1 (J. Appl. Polym. Sci., Vol. 30, 1241 (1985)).

Burke, Weatherly and Woodhams described roll-drawing of preheated sheets of isotactic polypropylene (Polym. Eng. Sci, Vol. 27, 518 (1987)). They reported draw ratios of 20:1 with a modulus and strength in the rolling direction of 20 GPa and 0.5 GPa respectively. Their rolling speed did not exceed 2 m/min.

Sun, Berg and Magill described a process they called rolltrusion which combines rolling and tension and applied it to isotactic polypropylene to produce unique 3-D properties (Polym. Eng. Sci. Vol. 30, 635 (1990) and Vol. 29, 715 (1989)). Property enhancement occurred both in the rolling and transverse directions. Their process was adiabatic. However, the speeds reported were relatively low, i.e. 0.28 to 6.5 cm/min. Draw ratios up to 33 in the rolling direction were reported (PES, vol. 30, 635, 1990, vol. 29,715 1989). Moduli as high as 22 GPa were reported in the rolling direction.

Rolling has been performed thus far essentially on polyethylenes and polypropylene. No study was concerned with engineering resins such as polyesters, polyamides and polyketones.

Known prior art processes do not allow proper control of relaxation and orientation of the plastic, and thus do not allow good control of final properties. Due to relaxation and the thicknesses generally used, the level of orientation that can be obtained by current processes is limited. Fracture of the profiles can occur if there is inadequate balance between tension and compression. Further, known processes do not allow for satisfactory transverse properties. In order to achieve higher orientations, several passes are required.

It is an object of the present invention to provide a process through which highly oriented profiles of various thermoplastics, including semicrystalline thermoplastics and engineering resins, with high modulus and strength, can be produced continuously or by batch operation, with full control of the drawing conditions.

It is another object of the present invention to provide a process for producing oriented polymeric profiles with relatively high mechanical properties, the process affording a balance between relaxation and deformation of the material of the profile.

SUMMARY OF THE INVENTION

According to the present invention, a process is provided for production of polymeric profiles having molecular orientation and improved mechanical properties, the process comprising melt extrusion of a strip of the material, followed by a controlled solidification and a combined compression rolling and tension using at least one pair of rolls, and controlling the extent of deformation throughout the process to induce molecular orientation of the material along at least one of the axes. The control is aimed, among other factors, at countering the effects of relaxation of the profiles during the deformation.

The process includes the following steps:

extruding polymeric profiles by melt extrusion followed by controlled solidification of the polymer, subjecting the solidified profile to a multiple sequential combination of compression rolling and drawing, controlling the extent of deformation of the profile by controlling the compression and tension on the profile to counter the relaxation of the material and to maintain the deformation below the tensile failure limit of the material.

The multiple compression rolling/drawing is effected preferably with the material maintained at a temperature below and close to its melting point.

The draw ratios and improvement of properties achieved depend on the polymer structure, temperature, speed and the load capacity of the rollers.

In another aspect of the invention, there is provided an apparatus for producing a profile of a polymeric material having a relatively high molecular orientation, said apparatus comprising:

an extruding means for melt-extruding a strip of said material, thermal conditioning means for conditioning of said strip, at least one pair of rolls for reduction of thickness of said strip, tensioning means for applying a tension on said strip after said at least one pair of rolls, a take-up means for receiving said strip after deformation, tension monitoring means for monitoring said tension on said strip, tension control means for adjusting said tension on said strip, and thickness reduction monitoring means for monitoring the thickness reduction of said strip, and thickness reduction control means for adjusting the thickness reduction of said strip.

The term "rolling" in the instant specification should not be equated with a take-up arrangement. In this specification, "rolling" denotes effecting permanent positive deformation (thickness reduction), as opposed to mere gripping and pulling by nip rolls.

DETAILED DESCRIPTION OF THE INVENTION

Figure 1:
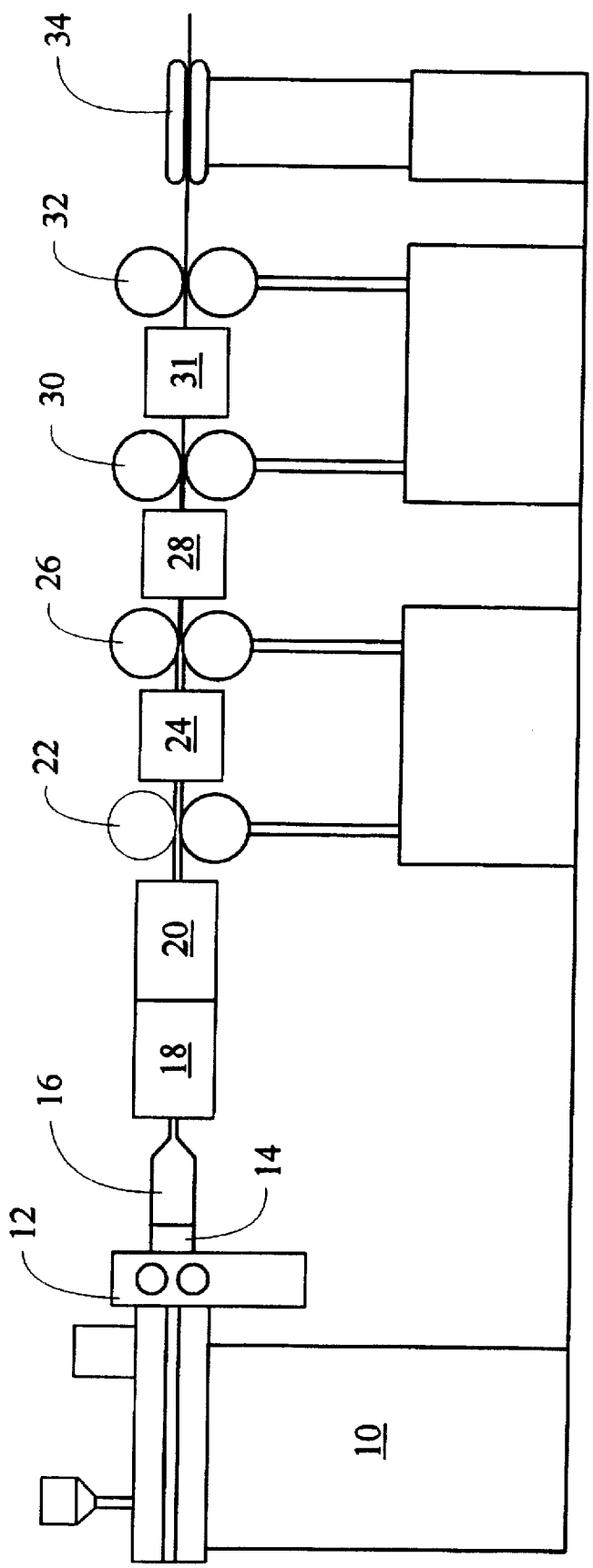
FIG. 1 illustrates an apparatus to carry out the process of the invention.

An apparatus for carrying out the process of the invention is illustrated in FIG. 1. It consists of an extruder 10 to which a gear pump 12 is attached to stabilize the output of the extruder, particularly at high extrusion rates. Two die geometries were used in this invention: a flat profile die having a width of 10 cm and thickness of 1 cm, and a 900° angle die with 5 cm on each side and thickness of 1 cm. The flat die 14 is illustrated on FIG. 1. The die is followed by a calibrator 16 containing water cooling channels to allow complete solidification and crystallization of the polymer. The profile is immediately fed into heating tunnels 18 and 20 just after the calibrator exit. The actual total tunnel length is 2.5 m.

Figure 2:
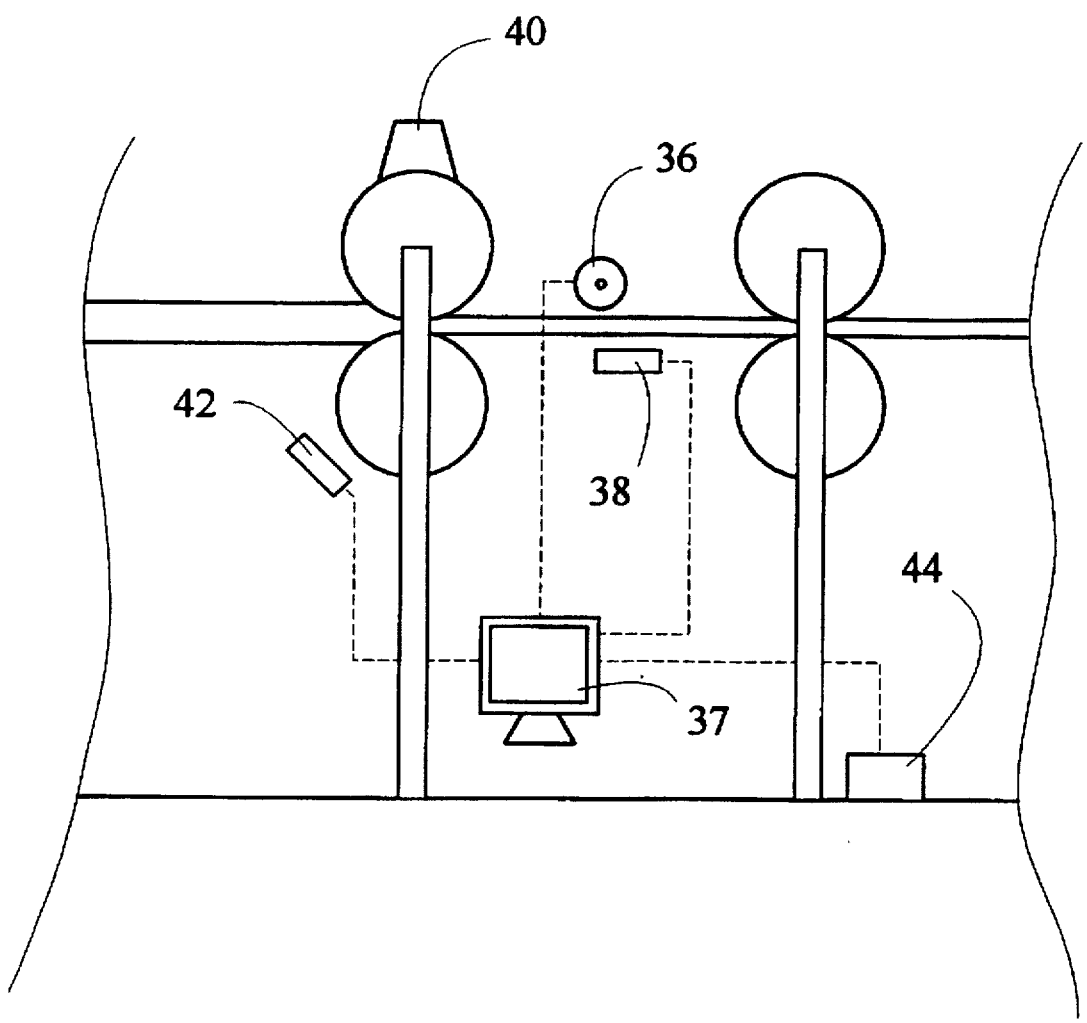
FIG. 2 is a schematic representation of the rolls with tension exerted on the profile.

Two heating guns blowing hot air into the tunnels are used to control the temperature of the profile, depending on the polymer used. The polymer profile is thus brought to the desired deformation temperature before entering the first roll station 22. The profile speed is monitored using a wheel 36, shown in FIG. 2, on top of the polymeric profile, the wheel being coupled to an encoder (not shown) and connected to a computer 37 (FIG. 2) for acquisition of linear profile speed. A thermocouple 38 (FIG. 2) for measuring the temperature of the profile is also connected to the computer.

In the tests, the rolls had a diameter of 30 cm, a width of 20 cm and were heated by hot oil through channels inside the rolls. The speed of the rolls was monitored and changed depending on the deformation of the profile.

The speed of the rolls was always higher than the speed of the profile after the rolls which indicates slippage of the profile between the rolls. The deformation ratios that were obtained after the first set of rolls depended on the material and level of tension imposed by the following set of rolls. Significant relaxation after the first set of rolls was observed for the materials used as will be discussed in the following examples. A linear variable displacement transformer (LVDT) sensor 40 for measuring the gap between the rolls was installed on the pair of rolls 22 and the gap monitored through data acquisition into the computer 37.

The first roll station 22 is followed by a heated tunnel 24 in which blown hot air is used to maintain the profile's temperature. The profile is then fed to the second set of rolls 26, identical to the first set. The tunnel's temperature as well as the roll surface and inside oil temperature are also monitored by computer 37, the roll surface temperature sensor 42 being shown in FIG. 2. The motor power used for this set of rolls is three times that of the first rolls to compensate for the higher strength and speed of the deformed polymer. The second set of rolls 26 is aimed at maintaining a certain level of tension, depending on the material and level of longitudinal draw desired, as well as at a further deformation of the polymer. Control of tension is attained by adjusting the speed of this set of rolls 26 and measuring the speed of the profile between the two roll stations, as sketched on FIG. 2.

The first and second roll stations 22, 26 are part of the same roller die unit. A LVDT sensor 40 for roll gap measurement (FIG. 2) is installed also on the second pair of rolls and the gap is monitored by the computer 37.

After the second pair of rolls 26, the profile enters a third tunnel 28 whose temperature is controlled by blown hot air from a heat gun, not shown. The temperature as well as the profile's speed are monitored in this tunnel as in the previous sections. The third (30) and fourth (32) pair of rolls are part of a second roller die unit installed just after the third heated tunnel. The third pair of rolls 30 is used to maintain a certain level of tension on the profile and deform it further. The level of tension was controlled by the roll speed and monitored by the profile's speed between the second and third pair of rolls. The temperature of the third and fourth pair of rolls was controlled by hot oil and the temperature of their surface as well as inside oil temperatures were monitored by the computer 37. A heated tunnel 31 separates the third and fourth pair of rolls, the temperature in the tunnel being controlled by blown hot air and monitored by the computer.

The final deformation of the profile takes place at the last pair of rolls 32. Little further deformation is imposed by this set of rolls. Its main purpose is to maintain a tension on the profile to minimize relaxation and maintain the level of desired draw of the polymer. The tension between this set of rolls and the third pair of rolls 30 is controlled through the speed of the respective rolls and measured by a tension cell 44 (FIG. 2) mounted between the two stations. The speed of both third and fourth pair of rolls was monitored by the computer. The temperature of the last pair of rolls was lower than that of the preceding stations.

After the last pair of rolls, the profile is passed through a take-up device 34 whose speed is controlled manually and monitored by computer. The speed of the take-up device is adjusted such that a maximum tension (tension just below that at which the profile will break) is imposed on the profile. The distance between the last roll station 32 and the take-up is about 1 m. Fresh air is blown onto the profile after the fourth roll station through blowers, not shown, to accelerate cooling.

In some experiments, liquid nitrogen was directly blown onto the profile in this section to accelerate even more the cooling of the profile and to allow higher draw ratios to be obtained.

As can be clear form the process description, it is possible to control the degree of deformation of the polymer by compression between the rolls (rolling) of one station and by tension (drawing) between two sets of stations, from which the process name (roll-drawing) is derived. Also, by imposing a minimum tension (tension just above that at which no surface roughness is observed on the profile), biaxial deformation of the profile can be achieved. Hence, a profile having larger, lower or the same width as the original profile can be achieved. For obtaining e.g. good transverse properties, wider or a similar profile width is needed. The level of deformation can be controlled by the rolls' gap and tension, the deformation rate by the profile and roll speed and the temperature by the blown hot air. All these parameters depend on the polymer and desired properties of the final material, as will be discussed in the example section.

The polymers to be used are preferably semi-crystalline. Deformation of these semi-crystalline polymers was carried out at a temperature 10° to 80° C. below their melting temperature. The initial speed (before the first pair of rolls) of the profile was between 10 cm/min. and 1.2 m/min. Its final speed (after the take-up) depends on the final draw ratio and ranged from 0.5 m/min. to 10 m/min.

Experiments were carried out continuously from the polymer pellets to the final oriented profile or in two steps, by extruding separately long strips of the material (using the same die) followed by deformation of the profile in a second stage. This procedure was used when the polymer quantity was not sufficient for the continuous operation of the process, or to evaluate the effect of a specific process parameter, excluding the extrusion step.

The process described herein is particularly suitable for engineering and high performance polymers. In fact, commodity resins, such as polyethylene and polypropylene, suffer from their low melting temperatures which limit their use in many applications. Polyethylene and polypropylene were tested to validate the invention, but the research was focused on polymers having high melting temperatures ($T_m$) such as polyethylene terephthalate ($T_m=255°$ C.), polyamides (PA-11, $T_m=175°$ C. and PA-6, $T_m=220°$ C.) and polyether ether ketone ($T_m=334°$ C.).

EXAMPLES

Example 1

Polyethylene terephthalate (PET).

An extrusion grade of PET (having an intrinsic viscosity of 1, Mw=54,600 and Mn=28,800, from DuPont) was used. It was first dried at 120° C. before feeding to the extruder. The feed zone temperature of the extruder was set between 240° and 260° C., the following zone temperatures were between 260° and 290° C., and the die zone temperature between 265° and 280° C. The gear pump section temperatures were set between 270° and 280° C. The extruder RPM and resulting pressure depended on the output used. The extruder's output profile speed was between 20 and 100 cm/min. Both flat and angle profile dies were used with this polymer.

Figure 3:
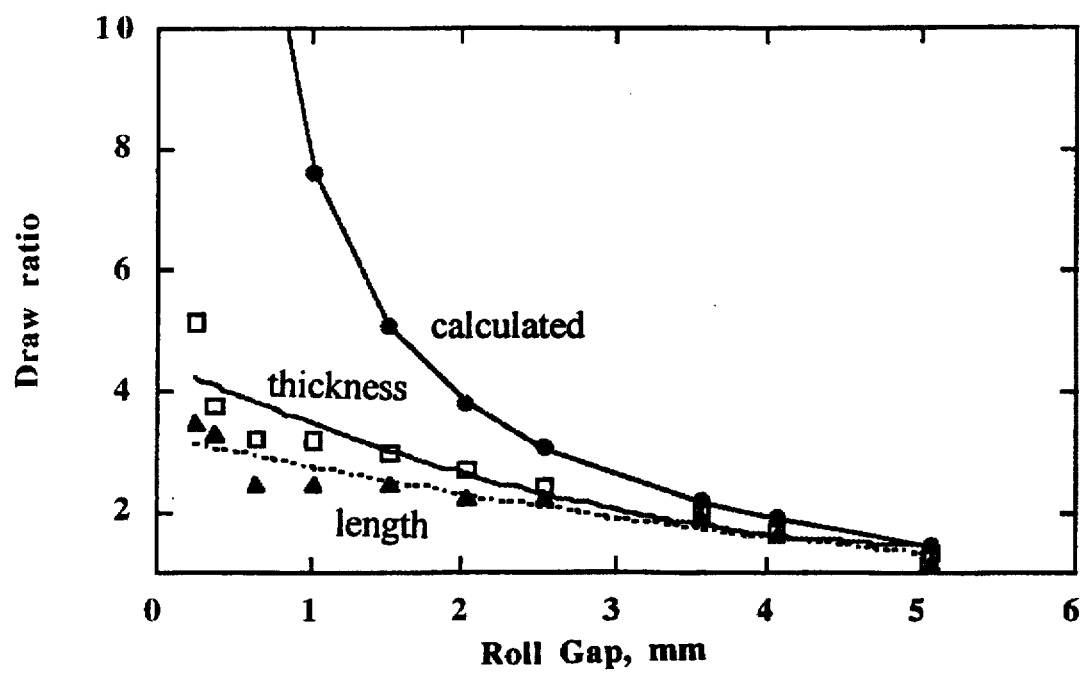
FIG. 3 is a graph illustrating draw ratios obtained at a minimum tension.

The deformation temperature used ranged from 180° to 230° C. The maximum draw ratio achieved without tension was around 3 in the length direction without change in the width direction. If further deformation is imposed to the profile, continuous fracture of the profile occurs due to relaxation effects. Some results obtained for draw ratio in the length and thickness directions for an imposed minimum tension are presented on FIG. 3. The calculated draw ratio is also shown and was calculated as the ratio of the initial thickness of the profile to the gap between the rolls.

It is clearly observed that the measured draw ratios are much lower than the calculated ones, especially at a low roll gap. This is an indication of the relaxation phenomenon that is taking place when rolling the polymer and which can be minimized by the application of tension. It is also observed that the thickness reduction ratio (ratio of the initial to the final thickness of the profile) is higher than that in the length direction, particularly at high draw ratios. This is a clear indication of biaxial orientation of the polymer (the final width is larger than the initial one).

Figure 4:
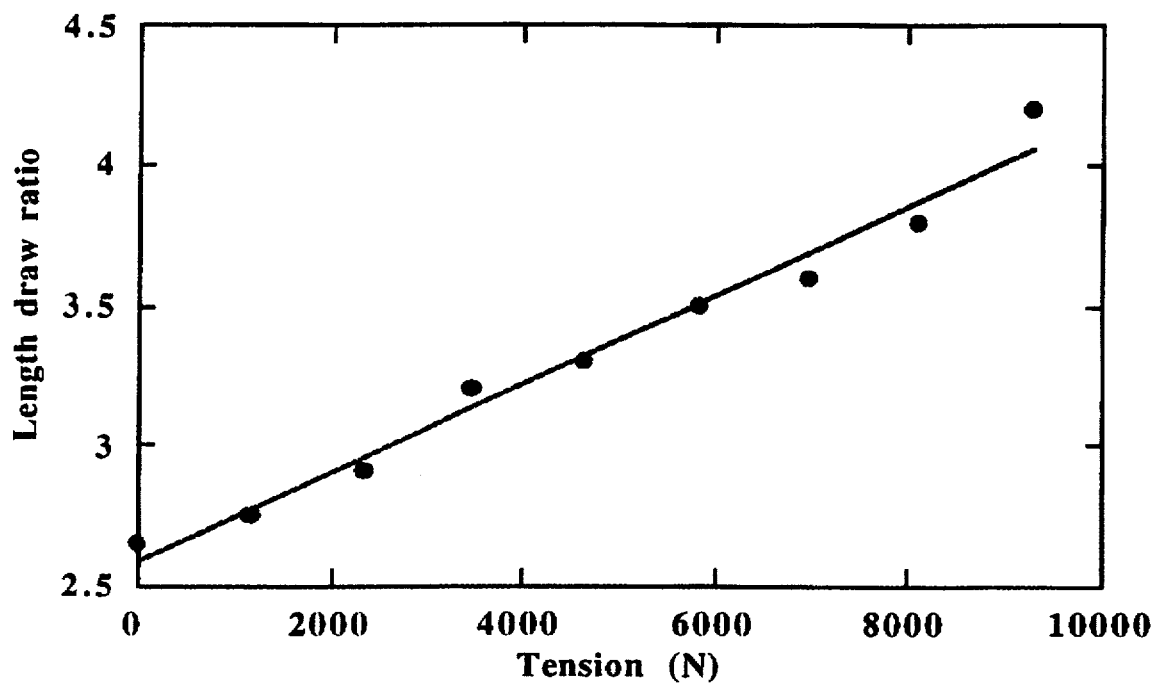
FIG. 4 is a graph illustrating change of draw ratio with tension.
Figure 5:
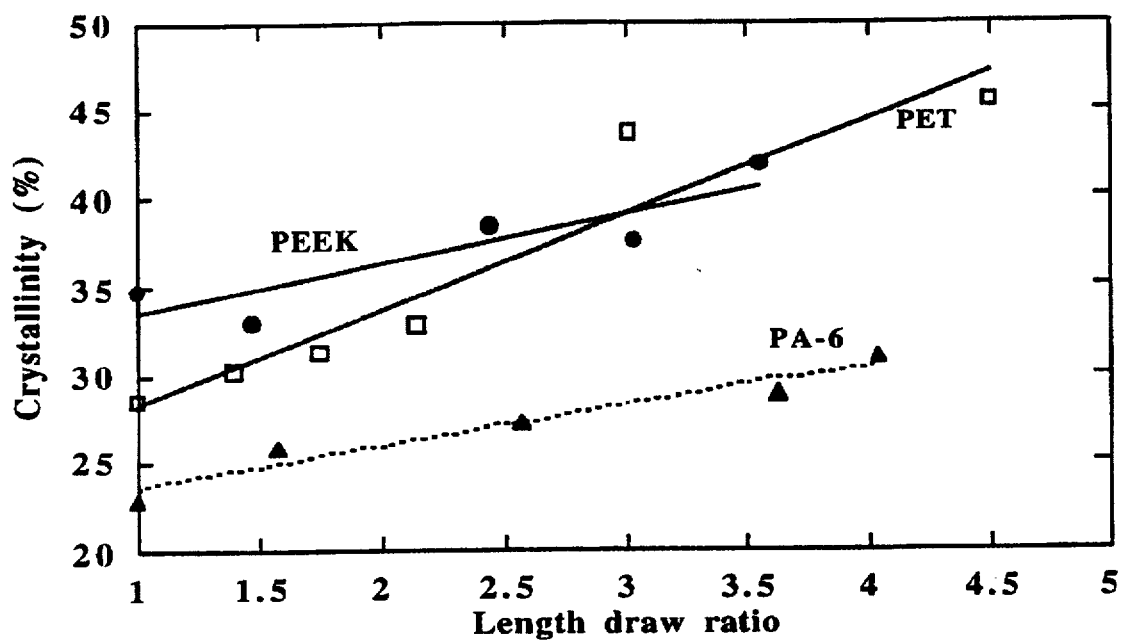
FIG. 5 is a graph illustrating the degree of crystallinity of some deformed polymers vs. draw ratio.

By the application of tension, the final draw ratio was raised considerably as illustrated in FIG. 4. For the conditions of FIG. 4 (gap of 2.5 mm, temperature of 200° C. and initial profile speed of 80 cm/min.), the profile broke at a tension of 10,000 N. With further deformation at the other rolling stations, the maximum draw ratio that was achieved with this PET was 5.2 under normal cooling conditions (ambient air). With liquid nitrogen cooling between the last roll station and the take-up, the maximum draw ratio attained was 5.6. Angle profiles were also drawn with this materials and the maximum draw ratio without break was 4.6. The maximum initial profile speed was 100 cm/min. (continuous), and the final profile speed was about 5 m/min.

Some results on the structure and properties of the oriented PET profiles obtained according to the invention are presented in FIG. 5 to 9. First, the crystallinity of the deformed materials is presented in FIG. 5 as a function of draw ratio. A constant increase in the crystalline content is observed with the extent of deformation due to the progressively higher alignment imposed on the polymer chains. The maximum crystallinity of the polymer was not attained and a further increase was still possible.

Figure 6:
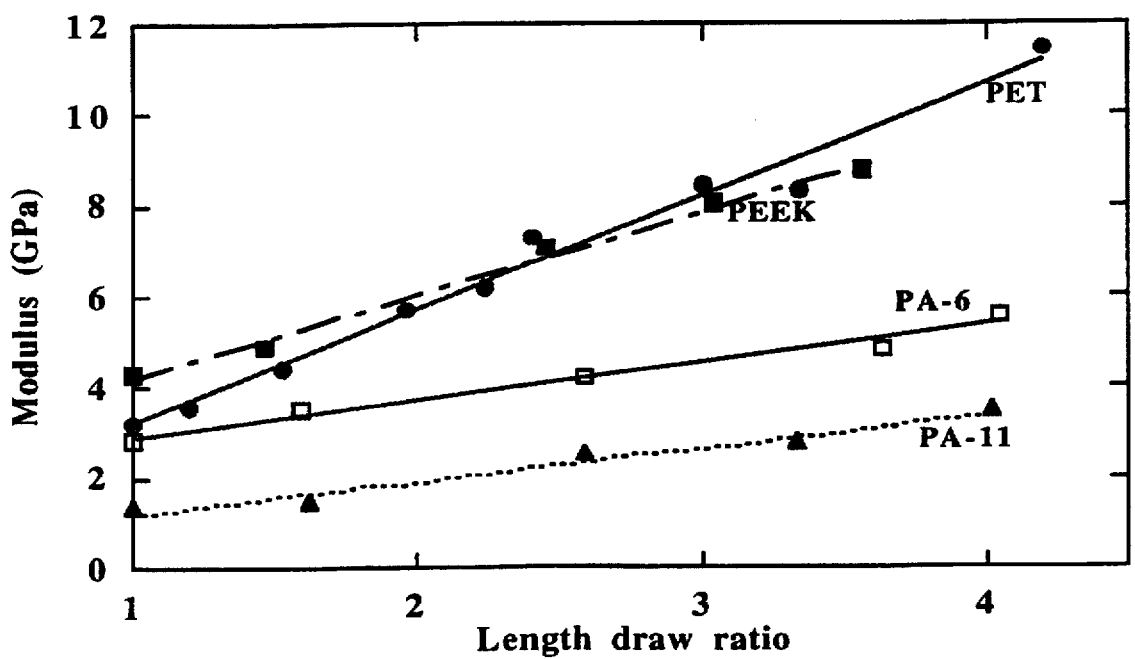
FIG. 6 is a graph illustrating the modulus vs. draw ratio for PET, PA-6, PA-11 and PEEK in the longitudinal direction.
Figure 7:
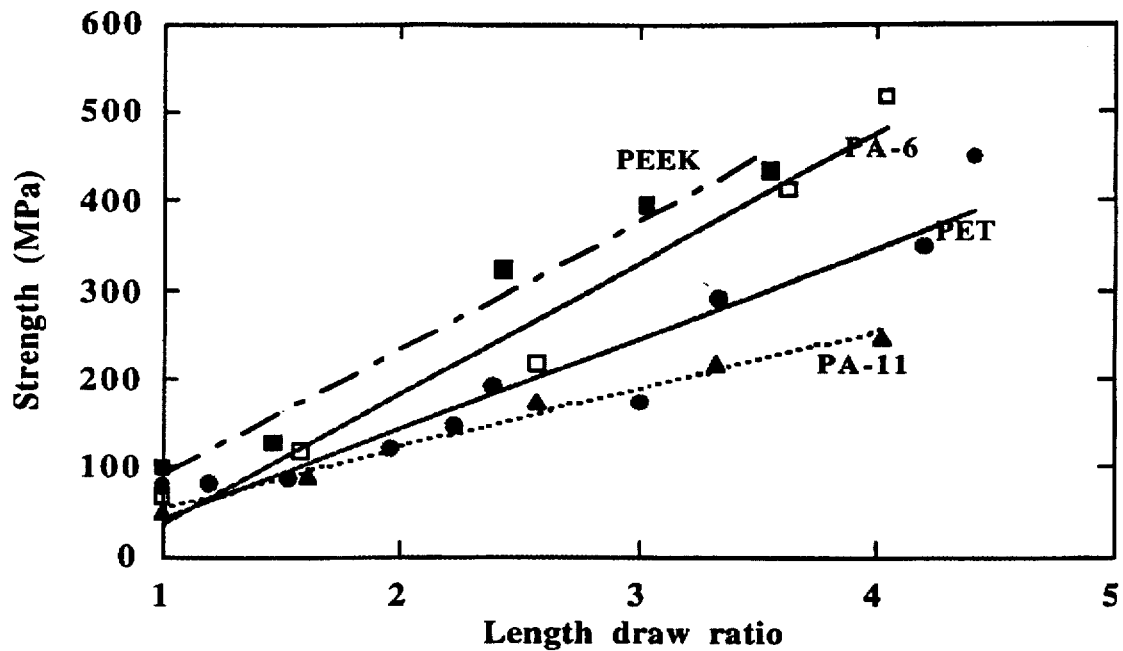
FIG. 7 is a graph of tensile strength vs. draw ratio for PET, PA-6, PA-11 and PEEK in the longitudinal direction.
Figure 8:
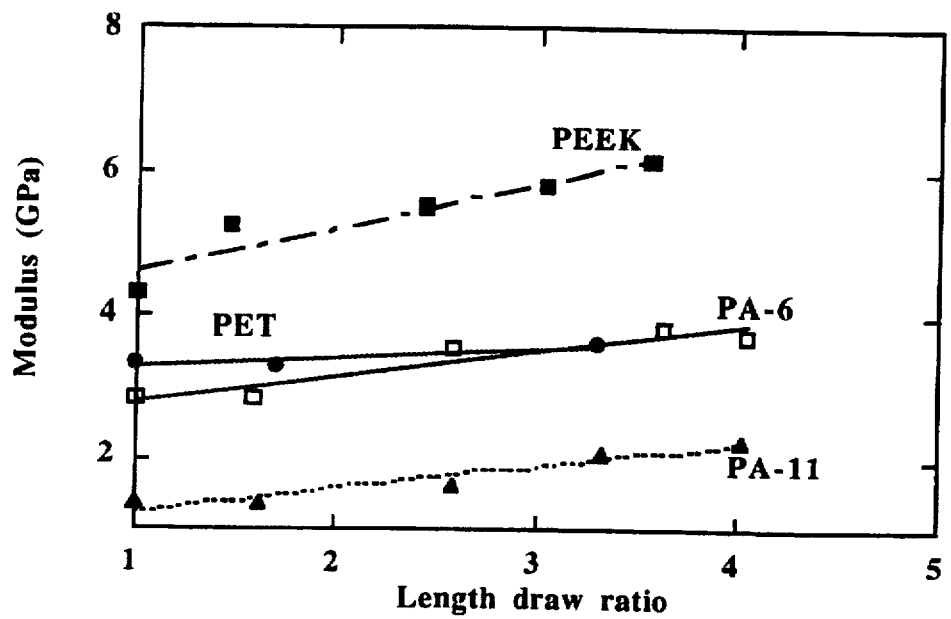
FIG. 8 is a graph of modulus vs. draw ratio for PET, PA-6, PA-11 and PEEK in the transverse direction.
Figure 9:
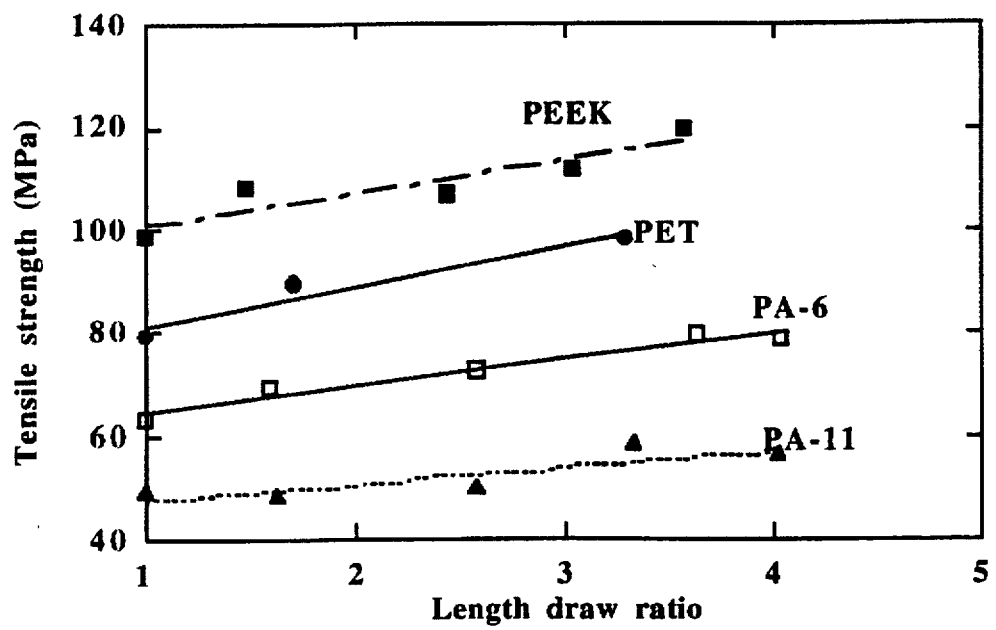
FIG. 9 is a graph of tensile strength vs. draw ratio for PET, PA-6, PA-11 and PEEK in the transverse direction.

The modulus in the direction of draw is shown in FIG. 6. Moduli as high as 19 GPa were obtained. In the transverse (width) direction, a slight increase in the modulus is observed with draw ratio (FIG. 8). This is due to the doubly oriented structure developed in the material upon roll-drawing. In contrast with axial drawing in which a decrease in the modulus is observed, here an increase is observed which is valuable for many applications. Tensile strengths in both longitudinal and transverse directions are shown in FIG. 7 and 9 respectively. Strength values as high as 700 MPa in the direction of draw were achieved. A slight increase in strength was observed in the transverse direction also (FIG. 9).

Example 2

Polyamide 6 (PA-6)

Extrusion-grade polyamide 6 (Ultramid, from BASF) having a melt index of 18 was used for the roll drawing tests. The extruder was fed directly from PA-6 sealed bags and the hopper was isolated from ambient air to minimize moisture uptake. The extrusion temperatures ranged between 210° and 240° C. and the profile shape was 10 cm wide by 7 mm thick. The temperatures of the heating tunnels as well as of the roll surfaces were fixed between 160° and 200° C. The experimental procedure was the same as that described above for PET (Example 1) and similar observations were noted. The maximum draw ratio achieved was around 5. The regularity of shape of the profile and its purity were critical to achieve high deformation (minute irregularity or impurity caused the profile break in some tests). The initial profile speed used for the tests was 20 to 50 cm/min. and the final output rate between 1 and 2.5 m/min.

Some results on the structure and properties of the oriented PA-6 profiles obtained according to the invention are presented in FIGS. 5 to 9. First, the crystallinity of the deformed materials is presented in FIG. 5 as a function of draw ratio. A constant increase in the crystalline content is observed with the extent of deformation due to the more and more alignment imposed to the polymer chains. The maximum crystallinity of the polymer was not attained and a further increase was still possible. The modulus in the direction of draw is shown on FIG. 6. Moduli around 6 GPa were obtained. In the transverse (width) direction, a slight increase in the modulus is also observed with draw ratio (FIG. 8). This is due to the doubly oriented structure developed in the material upon roll-drawing. In contrast with axial drawing in which a decrease in the modulus is observed, here an increase in modulus is observed which is valuable for many applications. Tensile strength is shown in FIGS. 7 and 9 in the direction of drawing and perpendicular to it, respectively. Strength values as high as 600 MPa in the direction of draw were achieved. A slight increase in strength was observed in the transverse direction also (FIG. 9).

Example 3

Polyamide 11 (PA-11)

An extrusion-grade polyamide 11 (Rilsan Besno, from Atochem) was used for the roll drawing tests. The extruder was fed directly from the PA-11 sealed bags and the hopper was isolated from ambient air to minimize moisture uptake. The extrusion temperatures ranged between 170° and 220° C. and the profile shape was 10 cm wide by 7 mm thick. The temperature of the heating tunnels as well as of the surfaces of the rolls were fixed between 130° and 160° C. The experimental procedure was the same as that described above for PET and similar observations were noted. The maximum draw ratio achieved was around 5. The regularity of shape of the profile and its purity were critical to achieve high deformation (minute irregularity or impurity caused the profile break in some tests). The initial profile speed used for the tests was 20 to 50 cm/min. Good transparency was obtained for the highly drawn profiles and final output rates between 1 and 2.5 m/min. were obtained.

Some results on the properties of the oriented PA-11 profiles obtained according to the invention are presented in FIGS. 6 to 9. The modulus in the direction of draw is shown in FIG. 6. Moduli around 4 GPa were obtained. In the transverse (width) direction, a slight increase in the modulus is observed with draw ratio (FIG. 8). This is due to the doubly oriented structure developed in the material upon drawing. In contrast with axial drawing in which a decrease in the modulus is observed, here an increase is observed which is valuable for many applications. Tensile strength is shown in FIGS. 7 and 9 in the longitudinal and transverse directions respectively. Strength values around 250 MPa in the direction of draw were achieved. A slight increase in strength was observed in the transverse direction also (FIG. 9).

Example 4

Polyether ether ketone (PEEK)

An extrusion grade of PEEK (Victrex, from ICI) was used for the roll drawing tests. The polymer was first dried in an oven at 120° C. for at least 24 hours. The polymer was then fed to the extruder hopper which was isolated from ambient air to minimize moisture uptake. The extrusion temperatures ranged between 310° and 360° C. and the profile shape was 10 cm wide by 7 mm thick. The heating tunnels as well as the rolls surfaces temperatures were fixed between 240° and 270° C. The experimental procedure was the same as that described above for PET and similar observations were noted. The maximum draw ratio achieved was around 4. The regularity of shape of the profile and its purity were critical to achieve high deformation (minute irregularity or impurity caused the profile break in some tests). The initial profile speed used for the tests was 10 to 40 cm/min. and the final output rates between 0.4 to 2 m/min.

Some results on the structure and properties of the oriented PEEK profiles obtained according to the invention are presented in FIGS. 5 to 9. First, the crystallinity of the deformed materials is presented in FIG. 5 as a function of draw ratio. A constant increase in the crystalline content is observed with the extent of deformation due to the increasing degree of alignment imparted to the polymer chains. The maximum crystallinity of the polymer was not attained and a further increase was still possible. The modulus in the direction of draw is shown on FIG. 6. Moduli around 10 GPa were obtained. In the transverse (width) direction, a slight increase in the modulus is observed with draw ratio (FIG. 8). This is due to the doubly oriented structure developed in the material upon drawing. In contrast with axial drawing in which a decrease in the modulus is observed, here an increase in the modulus is observed which is valuable for many applications. Tensile strength is shown on FIGS. 7 and 9 in the longitudinal and transverse directions respectively. Strength values as high as 500 MPa in the direction of draw were achieved. A slight increase in strength was observed in the transverse direction also (FIG. 9).

Example 5

Polypropylene (PP)

An extrusion-grade polypropylene (Himont Pro-Fax SR256M) having a melt index of 2 was used for the roll drawing tests. The resin was fed directly to the hopper of the extruder. The extrusion temperatures ranged between 210° and 240° C. and the profile shape was 10 cm wide by 7 mm thick. The temperatures of the heating tunnels as well as of the roll surfaces were fixed between 110° and 140° C. The experimental procedure was the same as that described above for PET and similar observations were noted. The maximum draw ratio achieved was around 11. The regularity of shape of the profile and its purity were critical to achieve high deformation (minute irregularity or impurity caused the profile break or fibrillate in some tests). The initial profile speed used for the tests was 20 to 50 cm/min. and the final output rates were between 2 and 5 m/min. Higher deformation ratios are possible with thicker profiles and higher deformation temperatures or lower rolling speeds.

Figure 12:
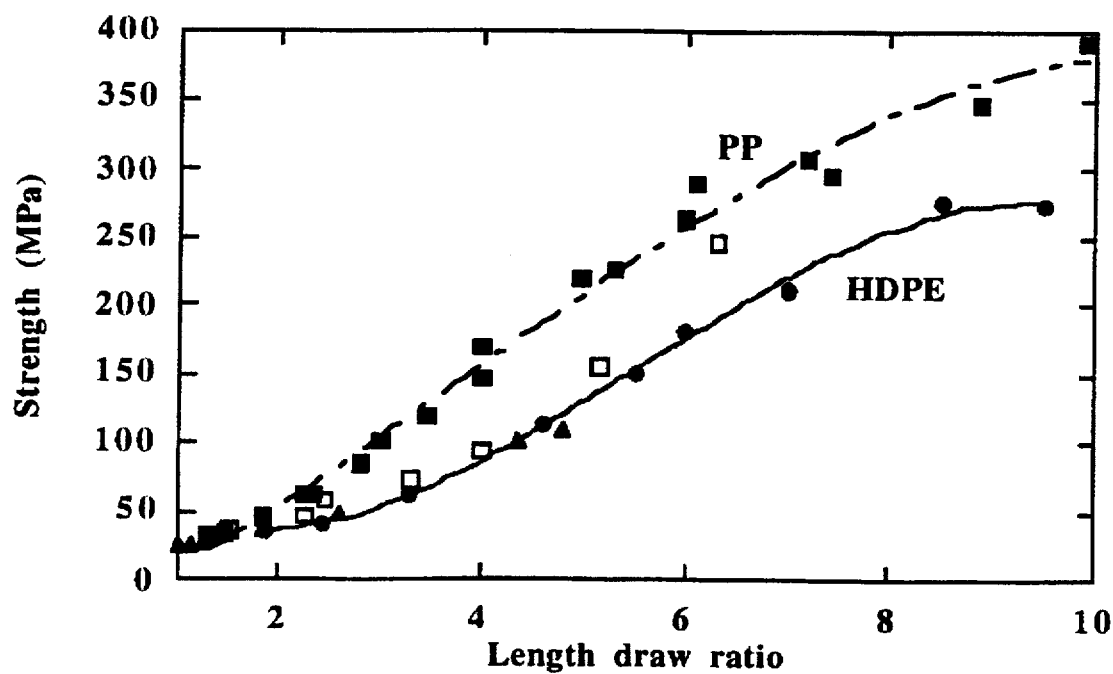
FIG. 12 is a graph of tensile strength vs. draw ratio for HDPE and PP in the longitudinal direction.
Figure 13:
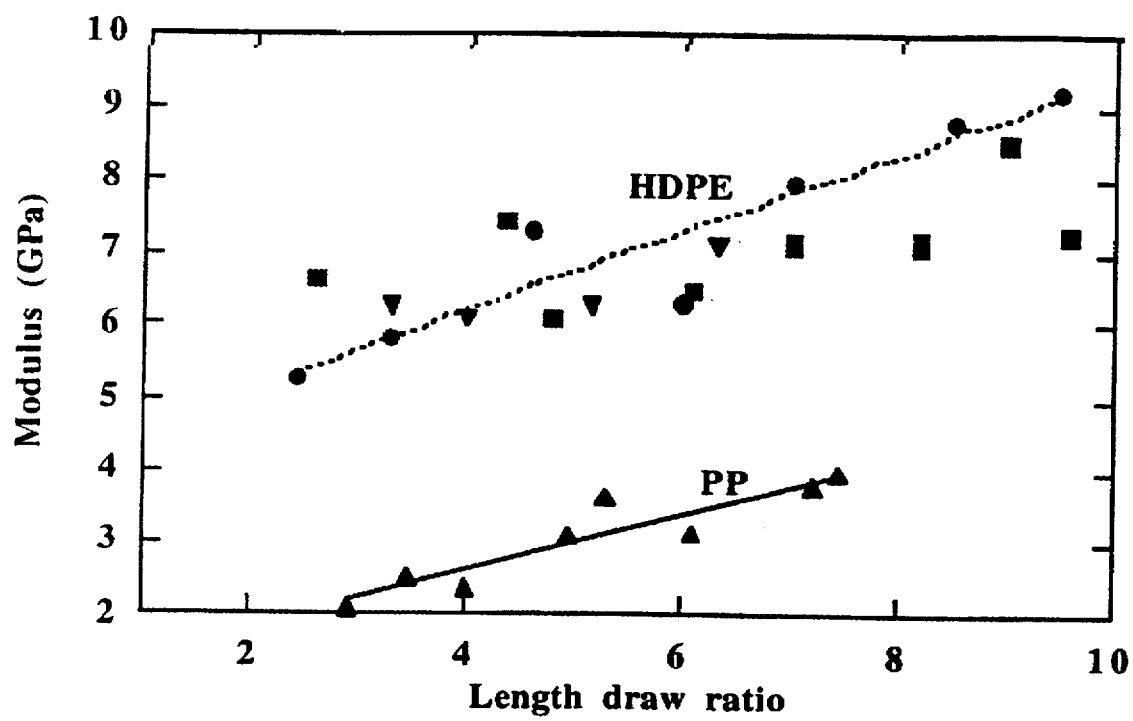
FIG. 13 illustrates modulus vs. draw ratio for HDPE and PP in the transverse direction.

Some results on the properties of the oriented PP profiles obtained according to the invention are presented on FIGS. 11 to 14. The modulus in the direction of draw is shown on FIG. 11. Moduli around 10 GPa were obtained in the longitudinal direction. In the transverse (width) direction, a slight increase in the modulus is observed with draw ratio (FIG. 13). This is due to the doubly oriented structure developed in the material upon drawing. In contrast with axial drawing in which a decrease in the modulus is observed, here an increase in modulus is observed.

Figure 14:
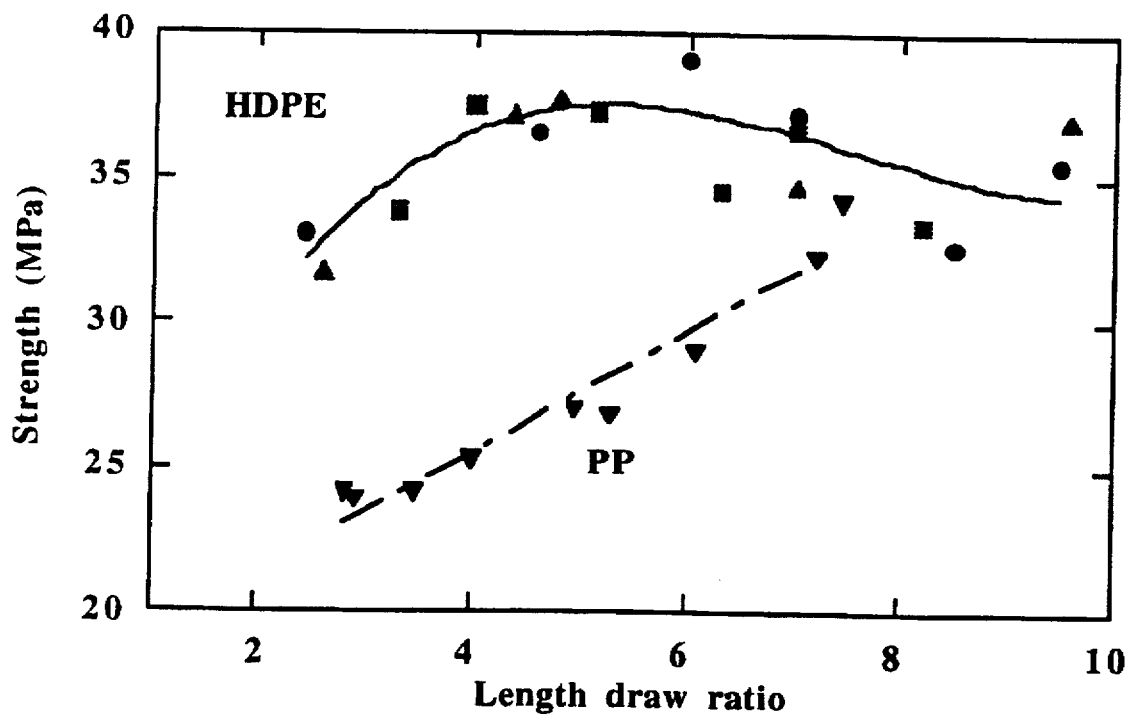
FIG. 14 is a graph of tensile strength vs. draw ratio for HDPE and PP in the transverse direction.

Tensile strength is shown in FIGS. 12 and 14 in the longitudinal and transverse directions respectively. Strength values as high as 300 MPa in the direction of draw were achieved. A slight increase in strength was also observed in the transverse direction (FIG. 14). Moduli around 20 GPa and strengths above 500 MPa in the draw direction can be achieved with thicker initial profiles, higher deformation temperatures or lower deformation speeds.

Example 6

High density polyethylene (HDPE)

Various different high density polyethylene materials were used in these tests, including an ultra-high molecular weight PE (UHMWPE). Both pre-xtruded profiles supplied by different manufacturers (10 cm wide and about 13 mm thick) and extruded ones prior to deformation (10 cm wide and 7 mm thick) were used. For the in-house extruded profiles, an extrusion-grade polyethylene (Novacor HBW952A) having a melt index of (9.5) was used for the roll drawing tests. The HDPE pellets were directly fed to the extruder hopper. The extrusion temperatures ranged between 210° and 240° C. and the profile shape was 10 cm wide by 7 mm thick. The temperatures of the heating tunnels as well as of the surfaces of the rolls were set between 100° and 120° C. The experimental procedure was the same as that described above for PET and similar observations were noted. The maximum draw ratio achieved was around 10 for HDPE and 4 for UHMWPE. The regularity of shape of the profile and its purity were critical to achieve high deformation (minute irregularity or impurity caused the profile break in some tests). The initial profile speed used for the tests was 20 to 50 cm/min. and the final output rate obtained was between 2 and 5 m/min.

Higher deformation ratios are possible with thicker profiles and higher deformation temperatures or lower rolling speeds.

Figure 10:
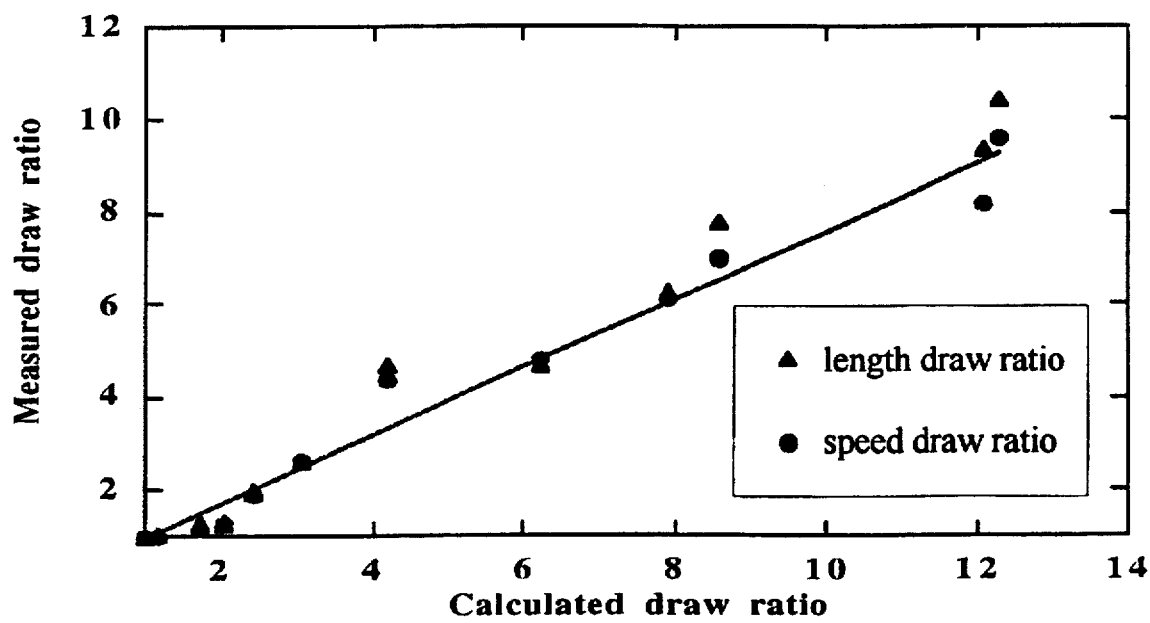
FIG. 10 is a graph showing the relationship of measured draw ratios (from speed in the longitudinal direction) vs. calculated draw ratios for HDPE.
Figure 11:
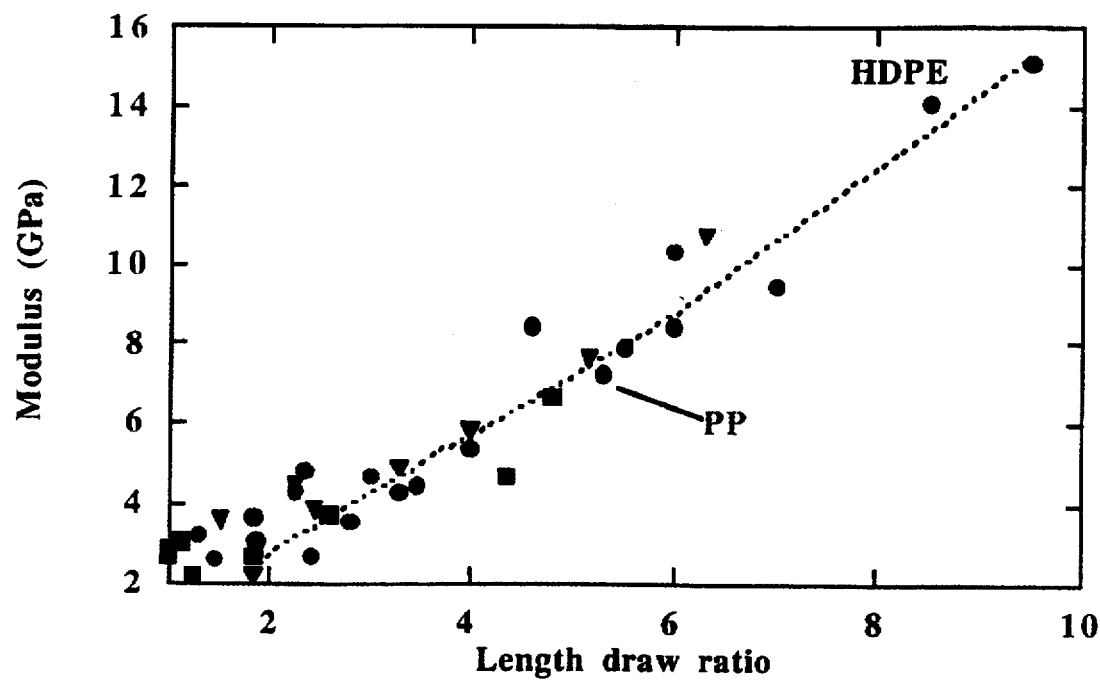
FIG. 11 illustrates modulus vs. draw ratio for HDPE and PP in the longitudinal direction.

FIG. 10 shows the measured draw ratios obtained for HDPE as a function of the calculated draw ratio (from the initial thickness of the profile and the gap between the rolls). The draw ratio was measured by two means: i) by measuring the distance between two ink marks before and after roll-drawing and ii) by measuring the profile's speed on-line before and after deformation. It can be observed that these two measurements give similar results. On-line speed measurement can thus be used to monitor and adjust process parameters to obtain the desired draw ratio. It can be also observed from FIG. 10 that the measured draw ratio is lower than the calculated one, indicating some relaxation and elastic recoil of the material.

Some results on the properties of the oriented HDPE profiles are presented in FIGS. 11 to 14. The modulus in the direction of draw is shown on FIG. 11. As can be seen, moduli around 15 GPa were obtained. In the transverse (width) direction, a slight increase in the modulus is also observed with draw ratio (FIG. 13). This is due to the doubly oriented structure developed in the material upon drawing. In contrast with axial drawing in which a decrease in the modulus is observed, an increase in the modulus is observed here which is valuable for many applications. Tensile strength is shown in FIGS. 12 and 14 in the longitudinal and transverse directions respectively. Strength values as high as 300 MPa in the direction of draw were achieved. A slight increase in strength was also observed in the transverse direction (FIG. 14) for draw ratios up to 6. Draw ratios above 20, moduli above 20 GPa and strengths above 500 MPa in the draw direction can be achieved with thicker initial profiles, higher deformation temperatures or lower deformation speeds.

It will be appreciated that the process of the invention is applicable especially in the start-up phase of the production of oriented profiles. It can, however, be used also during a continuous production of the profile to control the properties of the profile.

We claim:

1. A process for producing a profile of a polymeric material, said process comprising the steps of:

melt-extruding said polymeric material, solidifying said polymeric material, deforming said material by combined compression rolling within a nip of at least two pairs of compression rolls and tension to induce a molecular orientation of said material along at least one axis of said profile, the magnitude of the tension determined by the steps of:
a) determining the breaking tensile stress of the material,
b) determining the minimum tensile stress at which the deformed material is free of defects, and
c) choosing a tension between the breaking tensile stress and the minimum tensile stress, the tension corresponding to an acceptable draw ratio of the material.

2. The process of claim 1 wherein the extent of deformation is controlled by controlling the degree of compression and the tension on said profile.

3. The process of claim 1 wherein the deformation is effected at a temperature close to the melting point of said material.

4. The process of claim 2 wherein the extent of deformation is further controlled by controlling the temperature of said material.

5. The process of claim 1 wherein said compression rolling is effected by passing said profile through at least one passage between two driven rolls, the width of the passage being such to effect a thickness reduction of said profile.

6. The process of claim 5 wherein the control of the extent of deformation is effected by monitoring the thickness reduction of the profile resulting from the compression rolling, monitoring the speed of said profile before and after thickness reduction, evaluating the above parameters by comparison with their respective predetermined values and adjusting correspondingly the width of said passage and the speed of said rolls.

7. The process of claim 6 further comprising adjusting the temperature of said profile during deformation.

8. The process according to claim 1 wherein said polymeric material is a semicrystalline polyolefin.

9. The process according to claim 8 wherein said polymeric material is selected from the group consisting of high density polyethylene, ultra high molecular weight polyethylene and polypropylene.

10. The process according to claim 1 wherein said polymeric material is polyethylene terephthalate.

11. The process according to claim 1 wherein said material is a semicrystalline polyamide.

12. The process according to claim 11 wherein said material is selected from the group consisting of polyamide-6 and polyamide-11.

13. The process according to claim 1 wherein the polymer is polyether ether ketone.

14. An apparatus for producing a molecularly-oriented profile of a polymeric material, said apparatus comprising:

an extruding means for melt-extruding a strip of said material, thermal conditioning means for conditioning of said strip, at least two pairs of rolls having each a nip for compressive reduction of thickness of said strip in the nip, tensioning means for applying a tension on said strip after each of said at least two pairs of rolls, a take-up means for receiving said strip after deformation, tension monitoring means for monitoring said tension on said strip, tension control means for adjusting said tension on said strip, and thickness reduction monitoring means for monitoring the thickness reduction of said strip, thickness reduction control means for adjusting the thickness reduction of said strip, and processing means for evaluating monitoring input from said monitoring means and adjusting said tension control means.

15. The apparatus according to claim 14, further comprising temperature control means for monitoring the temperature of said strip between said extruding means and said take-up means.

16. The process of claim 1 wherein said combined compression rolling and tension is applied at multiple stages.

17. The process of claim 1 wherein the acceptable draw ratio is determined depending on the desired longitudinal and transverse deformation of the polymer.

* * * * *